United States Patent Office

2,839,515
Patented June 17, 1958

2,839,515

COPOLYMERS OF ETHYLENE AND ALPHA UNSATURATED OLEFINS

James M. Davison, South Charleston, and John F. Erdmann, St. Albans, W. Va., assignors to Union Carbide Corporation, a corporation of New York No Drawing. Application October 17, 1955
Serial No. 541,056

14 Claims. (Cl. 260—88.1)

This invention relates to a novel normally solid copolymer of ethylene and alpha unsaturated olefins and to a process for their production. More particularly the present invention is especially concerned with solid copolymers of ethylene having a melt strength adequate for forming therefrom clear thin films by conventional extrusion procedures.

Although it has been proposed heretofore to polymerize ethylene in admixture with compounds containing one or more double bonds, the resultant products in the instance where propylene or other alpha unsaturated olefin has been reacted with ethylene have usually been low molecular weight waxes or oils unsuitable for the production of tough, self supporting films or shock-resistant molded objects such as bottles, carboys and the like.

It has now been found that tough normally solid copolymers of ethylene and an alpha unsaturated olefin having a melt index value between about 0.1 and 40 can be readily prepared by subjecting ethylene in admixture with between 0.2 and 3.0 percent by volume thereof of an alpha unsaturated olefin having three or more carbon atoms as for example propylene, butene-1 and the like to a reaction pressure between about 20,000 p. s. i. and 40,000 p. s. i. or even higher pressures where equipment capable of withstanding such high pressures is available, and at a reaction temperature between about 160° C. and 350° C. for a contact time sufficient to form the copolymer, this contact time being as little as about 20 to 60 seconds in the instance of long tubular type reactors or about a minimum of 3 to 5 minutes when using autoclave type reactors.

The term melt index as herein used refers to the rate of flow of a heat-softened plastic in grams per ten minutes through an orifice 0.0825 inch in diameter by 0.315 inch long at 190° C. under a pressure of 43.1 p. s. i. according to the method of ASTM D–1238–52T. Melt index is inversely related to molecular weight.

The copolymers of ethylene and an alpha unsaturated olefin of the present invention having a melt index value of up to 40 are of adequate stiffness and toughness for practically all injection and compression molding applications. Moreover the molded articles of the herein described copolymers are substantially free from the defect of delamination or skinning which is often observed in articles injection molded from polyethylene homopolymer at injection temperatures below the optimum temperatures of about 210° C., for example at 150° C. to 175° C. These lower injection temperatures find favor in that they speed up the molding operation, but on the other hand, often cause delamination effects in the molded article apparently because the first portion of polymer injected in the relatively cool mold cavity has been chilled to a solid plastic condition before the whole injection charge of plastic has filled the mold cavity.

For the production of thin films by conventional extrusion procedures as for example the tubular method described in U. S. Patent No. 2,461,975, it has been found that the copolymers of ethylene and an alpha unsaturated olefin of the present invention having a melt index value of up to about 15 have sufficient melt strength to permit extrusion into thin film. Copolymers having melt index values above 15 which progressively reflect lower molecular weight copolymers have insufficient strength at extrusion temperatures to be blown or extended sufficiently to form a thin film.

An especially desirable property of certain of the herein described copolymers, namely those prepared with not more than a 2.0 volume percent concentration of alpha unsaturated olefin and at reaction temperatures less than 220° C. is the relatively high degree of clarity shown in extruded thin films made therefrom as compared to films prepared from polyethylene homopolymers produced by the polymerization of ethylene under high pressures as is described in U. S. Patent 2,153,533 to Fawcett et al. and U. S. Patent 2,188,465. While such polyethylene homopolymers have found extensive use as a packaging material when formed into thin films (0.0005 to 0.002 inch thick) they tend to have an undesirable frosty appearance and hence lack the desirable transparency of other packaging materials as for example cellophane. This frostiness of conventional polyethylene homopolymers is believed due to their elastic or "lumpy" type of flow during extrusion causing a fine surface roughness on the extruded film. Moreover the rubberiness or lack of adequate plasticity of polyethylene homopolymers causes breaks or tears in extruded sheets when being drawn down to thin films at high extrusion speeds. To some extent this rubberiness or "nerve" exhibited by conventional polyethylene homopolymers at molding temperatures can be reduced by hot-milling the polymer, but the hot-milling step is costly and time consuming. On the other hand, the copolymers of ethylene and an alpha unsaturated olefin of the present invention having a melt index value not in excess of 15 inherently possess good film-forming characteristics, and can be extruded rapidly into thin clear films without the need of a prior hot-milling step.

Other 1-alkenes or alpha unsaturated olefins copolymerized with ethylene reduce the elasticity of the melt in a similar fashion to propylene. The melt elasticity was measured by means of a resonance elastometer similar to that described by E. A. W. Hoff, "Journal of Polymer Science" 9, pp. 41–52 (1952). Essentially, the elastometer consists of a heated cylindrical pot ⅝-inch in diameter in which a coaxial plunger is suspended. The plunger is suspended free of any restoring torque. With the cup full of molten polymer (140° C.) the cup is oscillated through an angle of 3° at increasing frequencies while the maximum deflection of the plunger is measured. A resonant frequency can be found at which the deflection reaches a maximum. It has been found that for polymers made by the same process, but differing in molecular weight, that the ratio of the resonant deflection to the resonant frequency is a constant. This deflection-frequency curve has been found to be a good measure of the elasticity of the melt. The higher the slope, the more elastic the melt and the higher the haze of extruded thin film.

The effect of copolymerizing propylene or butene-1 with ethylene is shown by the following table in comparison with polyethylene homopolymer produced under equivalent reaction conditions.

TABLE 1

| Additive | Concentration | Reactor | Slope |
|---|---|---|---|
| None | | Large | 0.135 |
| Propylene | 1.0 | ...do | 0.080 |
| None | | Small | 0.164 |
| Propylene | 1.11 | ...do | 0.113 |
| Butene-1 | 0.32 | ...do | 0.148 |
| Do | 0.60 | ...do | 0.097 |

In the large reactor adding 1 percent propylene reduced the slope 0.055 and in the small reactor 0.051. That other 1-alkenes also reduce the melt elasticity is shown by the reduction of the slope to 0.148 and 0.097 by the addition of 0.32 and 0.66 percent butene-1.

The small reactor referred to in Table 1 was a steel tube 3/16-inch I. D. by 60 feet long equipped with a jacket through which the heating medium was circulated. The larger reactor was a steel tube of 1/2-inch I. D. by 460 feet long similarly equipped with a heating jacket.

Of the alpha-unsaturated olefins, propylene is preferred for copolymerization with ethylene because of its availability and relatively low cost. However, other alpha unsaturated olefins can be used to yield normally solid copolymers having improved molding properties as compared to conventional polyethylene homopolymers. Examples of such alpha-unsaturated olefins include butene-1; 3-methyl 1-butene; 1-pentene; 4-methyl 1-pentene; 3-ethyl 1-butene; 1-octene; and 1-octadecene.

The alpha unsaturated olefins should desirably be of high purity but may contain up to a total of 10 percent by volume of gases such as methane, ethane, nitrogen and carbon dioxide which are inert in the copolymerization reaction. The presence of other unsaturates such as the diolefins in the alpha-unsaturated olefin is undesirable and in general should not exceed about two percent by volume. More critical than the presence of diolefins is the content, if any, of acetylenic olefins and their content on the alpha-unsaturated olefin should be less than 100 parts per million by volume.

The ethylene should be equivalent in purity to that ordinarily used in forming polyethylene homopolymers by the high pressures oxygen catalyzed process described in Fawcett et al. in U. S. 2,153,553 and Perrin et al. in U. S. 2,188,465. In general the ethylene may be from any source and free from impurities, but it may contain small amounts of impurities such as nitrogen, ethane and carbon dioxide which in a total amount not exceeding 10 percent by volume are apparently inert in the copolymerization reaction. It is essential, however, that acetylene concentration, if any, be below 100 parts per million by volume and preferably below 50 p. p. m.

While the reaction is preferably carried out continuously in a tubular reactor, the process of this invention may be operated semi-continuously, or batchwise. Vigorous agitation and good cooling must be used in any case to provide for removal of the heat of polymerization.

The molecular weight of the copolymer decreases (melt index increases) as the pressure is lowered, as the alpha-unsaturated olefin concentration increases, and as the catalyst concentration increases. Therefore, in order to produce a copolymer which forms a good tough film on extrusion it is necessary to adjust reaction conditions to keep the melt index of the copolymer below 15 and preferably below 10. The hot melt strength of copolymers with a melt index above 15 is so low that frequent breaks occur in the extrusion process. Consequently, the reaction pressure should be between 20,000 and 40,000 p. s. i. and preferably from 25,000 to 35,000 p. s. i. The upper limit of reaction pressure is determined by the mechanical strength of the reactor and the pumps. The highest practical pressure is preferred because the highest molecular weights are achieved and higher conversions of ethylene to copolymer are possible.

The effect of increasing the reaction temperature is to lower the molecular weight of the copolymer. While copolymerization proceeds from the minimum activation temperature for the particular catalyst, as for example 160° C. in the use of molecular oxygen as catalyst, and up to 350° C., copolymers having a melt index less than 15 and suitable for film forming applications are generally obtained by maintaining the reaction temperature below 250° C. With molecular oxygen as catalyst, the preferred range of reaction temperature is from 160° C. to 220° C. to yield copolymers having a melt index value less than 15 and substantial clarity in film form.

The catalyst concentration in the reaction mixture has a profound effect on the molecular weight of the resultant copolymer. Thus, to obtain a copolymer having a melt index value between 0.5 and 15, oxygen in amounts from about 20 to up to 200 parts by volume per million of ethylene can be used at low reaction temperature between 160° C. and 220° C. But at higher reaction temperatures oxygen in amounts between 20–50 parts per million will suffice.

Although the preferred reaction is carried out in the absence of water or inert solvents, water or inert solvents may be added to aid heat transfer.

That the propylene or other unsaturated alpha-olefin is entering the polymer molecule is shown by the increase in the vinyl group content as determined from infra-red spectrum. Thus, polyethylene homopolymer made by the conventional high pressure process will exhibit from about 0.02 to about 0.06 ethylenic double bonds per thousand carbon atoms whereas the novel copolymers exhibit at least about 0.1 and up to about 0.6 ethylenic double bonds per 1000 carbon atoms.

The method used for determining content of vinyl groups in ethylene homopolymer and copolymers is as follows:

Polymer films about 36 mils in thickness were scanned using the Perkin-Elmer double beam spectrophotometer. Absorbences of the bands at 10.36 microns $$(R\text{---}CH\text{=}CH\text{---}R')$$

11.05 microns ($RCH\text{=}CH_2$), 11.26 microns $$\begin{array}{c}(R\text{---}C\text{---}R')\\ \parallel\\ CH_2\end{array}$$

were calculated and were used to obtain relative concentrations of unsaturated structures. Molar extinction coefficients were obtained from the literature [1] for each of the bands and were used to obtain the concentrations after suitable corrections were made to the absorbences.

The vinyl content in double bonds per thousand carbon atoms is calculated as follows:

$$C\text{=}C/1000 \text{ C's} = \text{absorbence at } 11.05 \text{ microns} \times 1.298$$

In the preferred process for preparing the novel copolymers, ethylene in admixture with the small amount of alpha unsaturated olefin is initially compressed to the selected reaction pressure and then fed continuously to a jacketed reaction tube where it is held at the desired reaction temperature and pressures for copolymerization to occur. The reaction mixture is usually continuously discharged from the tube reactor through a valve to a separating vessel where the copolymer and unreacted gas are separated. Accumulated copolymer is removed from the separator at intervals.

In the following Examples 1 to 6 employing propylene as the comonomer and Example 7 in which ethylene alone

---

[1] Cross, L. H., Richards, R. B., and Willis, H. A., "The Infrared Spectrum of Ethylene Polymers." Spectroscopy and Molecular Structure and Optical Methods of Investigating Cell Structure, a General Discussion of the Faraday Society (1950). The Aberdeen University Press Ltd.

was present, there was used a commercial size tubular reactor having an internal diameter of 11/16-inch and a length of 770 feet. The reaction conditions and properties of the resultant polymers are presented in tabulated form by Table 2.

TABLE 2

| Example No. | Feed Composition | | Reaction Conditions | | | Percent Conversion | Melt Index | Density, gm./cc. | Properties of Polymer | |
|---|---|---|---|---|---|---|---|---|---|---|
| | Propylene Volume, Percent | Oxygen, p. p. m. by Vol. | Reaction Pressure, p. s. i. | Temp., °C., Reaction Section | Contact Time, Sec. | | | | Vinyl Content, C=C/1,000 C's | 1.5 Mil Extruded Film Haze, Percent |
| 1 | 0.2 | 50 | 33,000 | 195±10 | 30 | 15.9 | 2.2 | 0.9187 | 0.213 | 13.5 |
| 2 | 0.3 | 50 | 33,000 | 195±10 | 30 | 17.2 | 2.9 | 0.9179 | 0.213 | 12.2 |
| 3 | 0.4 | 50 | 33,000 | 195±10 | 30 | 14.5 | 2.2 | 0.9185 | 0.239 | 9.8 |
| 4 | 0.5 | 49-56 | 33,000 | 195±10 | 30 | 15.4 | 2.7 | 0.9159 | 0.254 | 9.5 |
| 5 | 1.0 | 37-42 | 33,000 | 195±10 | 30 | 9.4 | 2.4 | 0.9175 | 0.292 | 7.2 |
| 6 | 1.5 | 30-37 | 33,000 | 195±10 | 30 | 6.1 | 5.0 | 0.9180 | 0.318 | 9.1 |
| 7 | None | 49 | 33,000 | 195±10 | 30 | 15.6 | 2.3 | 0.9161 | 0.056 | 14.1 |

The following methods were used to evaluate the polymer and the films formed by extrusion.

*Melt index.*—The method of ASTM D-1238-52T was used. This is defined as the rate of flow of the molten plastic in grams per ten minutes through an orifice 0.0825 inch in diameter by 0.315 inch long at 190° C. under a pressure of 43.1 p. s. i.

*Density.*—The density was determined on a plaque 0.070 inch in thickness compression molded at 170° C. and cooled in the press under pressure by running cold water through the platens. The specimen was annealed in an oven for 48 hours at 60° C. The density was determined by flotation in a liquid at 25° C. (see E. Hunter and W. G. Oakes, Trans. Faraday Soc. 41 (1945)).

*Haze.*—The haze was measured according to ASTM D-1003-52 which states: "The haze of a specimen is that percent of the transmitted light which in passing through the specimen deviates from the incident beam by forward scattering. For the purpose of this method only light flux deviating more than 2.5° on the average is considered to be haze."

*Film extrusion.*—The polymer was extruded into film by the tubular method of U. S. Patent 2,461,975, using a die with an annular opening of 1-inch O. D. by 0.012 inch wide. Because the haze of the film is very dependent on the conditions used in extrusion, tests were made with the following conditions:

Extruder _____ Royle No. 1.
Screw _____ 1½-inch diameter, decreasing pitch.
Screw speed _____ 20 R. P. M.
Temperatures, ° C.—
   Back barrel _____ 170.
   Front barrel _____ 180.
   Die _____ 210.
Screen pack _____ {40 mesh. 80 mesh. 100 mesh.}

An air cooling ring was used to maintain a "frost-line" about 10-15 inches from the die. The air pressure inside the tube and the take-up rate were adjusted to give a film thickness of 0.0015 inch.

It will be noted from the data presented in Examples 1 to 7 that the effect of increasing charged concentrations of propylene produces a significant rise in the melt index of the copolymer, a higher content of C=C groups, and lowers the haze content of films extruded from the resin.

Example 8

A mixture of ethylene and octadecene-1 (0.1 mol per hundred mols of ethylene) was compressed to 30,000 p. s. i. and fed continuously to a reactor at the rate of 30 lb./hr. After 45 seconds contact time in the reactor at 175° C. the product and unreacted feed materials were reduced to atmospheric and the polymer separated. After washing with acetone, a white, solid polymer with a melt index of 3.82 and a density of .9169 was isolated. That the octadecene-1 was combined with the polymer was shown by a vinyl content of 0.541 C=C's per thousand carbon atoms.

Instead of the molecular oxygen employed in the aforedescribed as catalyst, there can be used small amounts of known peroxide catalysts for the homopolymerization of ethylene, as for example acyl peroxides, alkyl hydroperoxides and dialkyl peroxides. The amount of such peroxide catalyst required for a catalytic effect is in about the same range as that required for molecular oxygen, but specific peroxides may require a smaller or larger amount for optimum effect. Thus in the instance of tertiary butyl peroxide, between 5 and 50 moles by weight thereof per million moles of ethylene is sufficient to promote a controllable reaction rate whereas lauroyl peroxide or benzoyl peroxide are ordinarily used in amounts between 60 and 300 moles per million ethylene reactant.

What is claimed is:

1. A normally solid copolymer of ethylene and between 0.2 percent and 3 percent by volume thereof of an alpha unsaturated olefin having at least three carbon atoms, said copolymer having a density at 25° C. substantially between 0.915 and 0.919.

2. A normally solid copolymer of ethylene and between 0.2 percent and 3 percent by volume thereof of an alpha unsaturated olefin having at least three carbon atoms, said copolymer having a melt index value between 0.1 and 40, said copolymer having a density at 25° C. substantially between 0.915 and 0.919.

3. A normally solid copolymer of ethylene and between 0.2 percent and 3 percent by volume thereof of an alpha unsaturated olefin having at least three carbon atoms, said copolymer being characterized by extrudability into thin film form and having a melt index value not in excess of 15, said copolymer having a density at 25° C. substantially between 0.915 and 0.919.

4. A normally solid copolymer of ethylene and between 0.2 percent and 3 percent by volume thereof of an alpha unsaturated olefin having at least three carbon atoms, said copolymer having between about 0.1 and 0.6 ethylenic groups per 1000 carbon atoms as determined from infrared spectrum, said copolymer having a density at 25° C. substantially between 0.915 and 0.919.

5. A normally solid copolymer of ethylene and between 0.2 percent and 3 percent by volume thereof of propylene, said copolymer having a density at 25° C. substantially between 0.915 and 0.919.

6. A normally solid copolymer of ethylene and between 0.2 percent and 3 percent by volume thereof of propylene said copolymer having a melt index value between 0.1 and 40, said copolymer having a density at 25° C. substantially between 0.915 and 0.919.

7. A normally solid copolymer of ethylene and between 0.2 percent and 2 percent thereof by volume thereof of propylene, said copolymer having a density at 25° C. substantially between 0.915 and 0.919, a melt index value between 0.1 and 15, and between 0.1 and 0.6 ethylenic groups per 1000 carbon atoms as determined from infrared spectrum.

8. Extruded film consisting of an ethylene-propylene copolymer according to claim 7.

9. A normally solid copolymer of ethylene and between 0.2 percent and 3 percent by volume thereof of butene-1, said copolymer having a density at 25° C. substantially between 0.915 and 0.919.

10. A normally solid copolymer of ethylene and between 0.2 percent and 3 percent by volume thereof of octadecene-1, said copolymer having a density at 25° C. substantially between 0.915 and 0.919.

11. Process for preparing copolymers of ethylene and an alpha unsaturated olefin having at least three carbon atoms which comprises reacting in the presence of an ethylene polymerization catalyst selected from the group consisting of oxygen and a peroxide a mixture of ethylene and between 0.2 percent and 3 percent by volume thereof of the alpha unsaturated olefin at a pressure between about 20,000 and 40,000 pounds per square inch and a temperature between 160° C. and 350° C.

12. Process for preparing copolymers of ethylene and an alpha unsaturated olefin, which comprises reacting a mixture containing ethylene and an unsaturated olefin having at least three carbon atoms and in a volume concentration between 0.2 percent and 2 percent of the ethylene, at a pressure between about 20,000 and 40,000 pounds per square inch, a reaction temperature between 160° C. and 220° C. and in the presence of oxygen as a catalyst in amount between 20 and 200 parts by volume per million parts ethylene.

13. Process according to claim 12 in which the alpha unsaturated olefin is propylene.

14. Process according to claim 12 in which the alpha unsaturated olefin is butene-1.

References Cited in the file of this patent

UNITED STATES PATENTS

| | | |
|---|---|---|
| 2,405,962 | Larson | Aug. 20, 1946 |
| 2,691,647 | Field et al. | Oct. 12, 1954 |